United States Patent Office 2,718,754
Patented Sept. 27, 1955

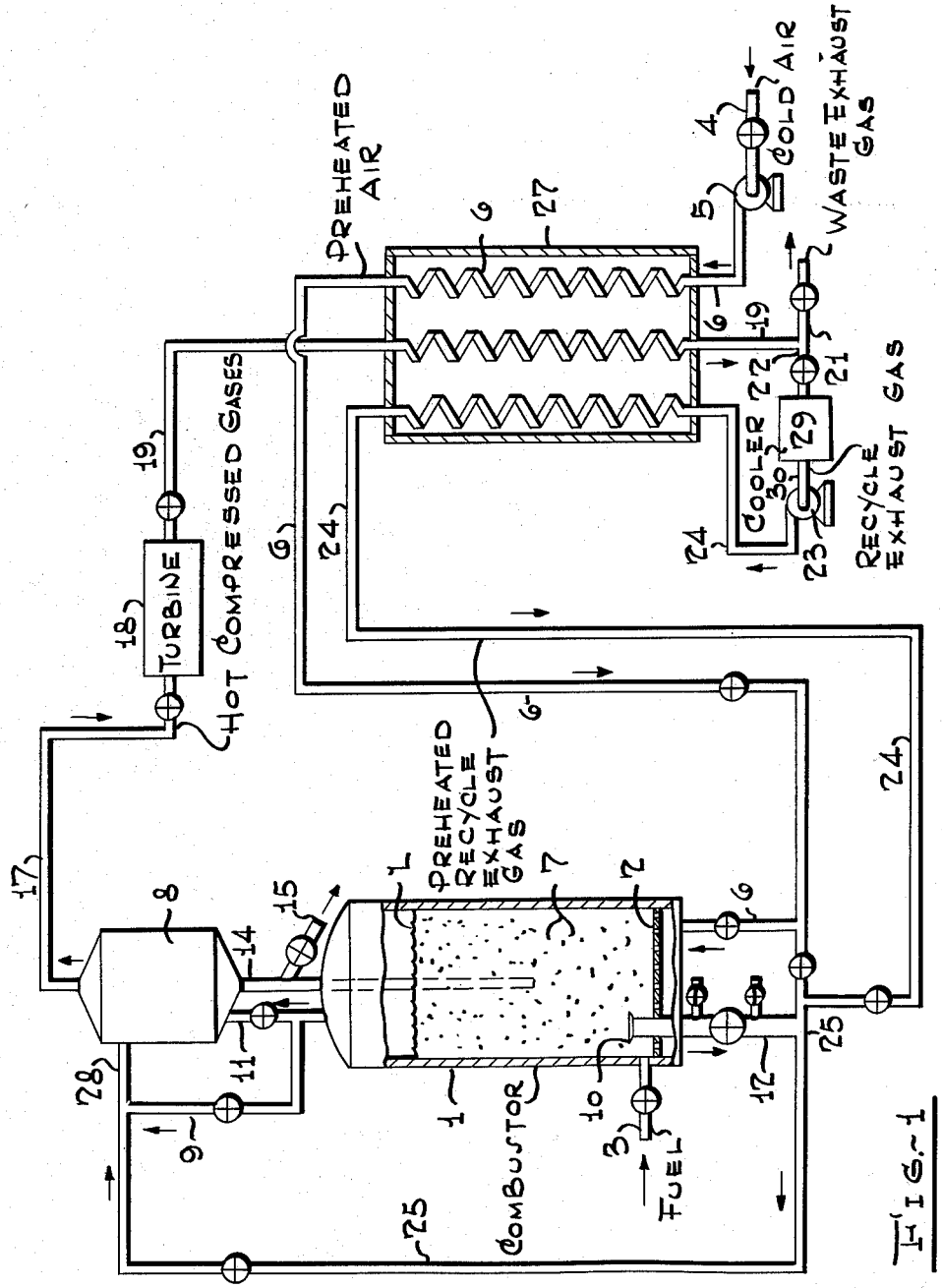

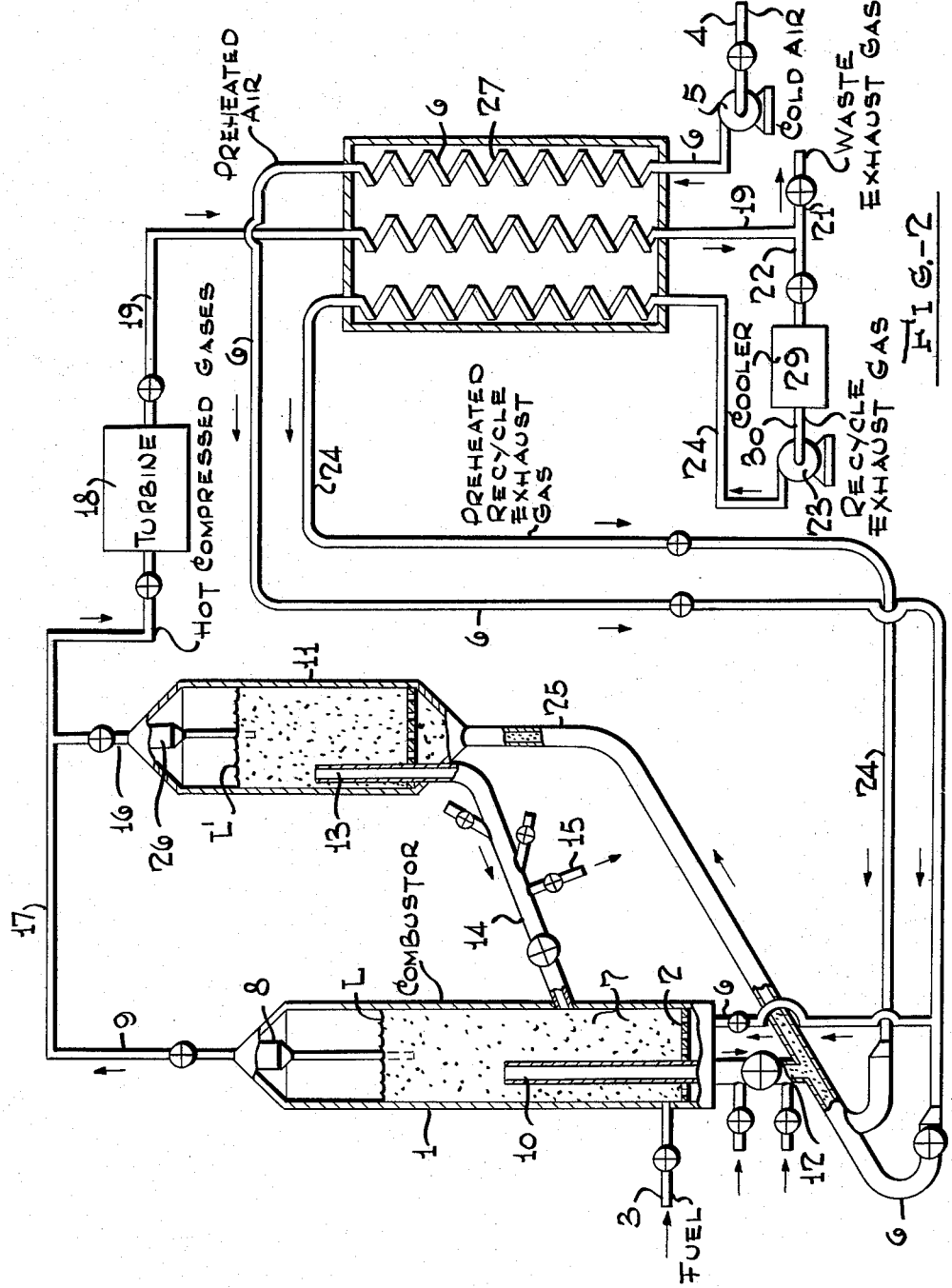

2,718,754
COMBUSTION SYSTEM FOR COMBUSTION GAS TURBINES

Warren K. Lewis, Newton, and Edwin R. Gilliland, Arlington, Mass., assignors to Esso Research and Engineering Company, a corporation of Delaware Application June 30, 1951, Serial No. 234,552

17 Claims. (Cl. 60—39.02)

This invention relates to a combustion system for combustion gas turbines.

A combustion gas turbine is a turbine driven by combustion gas produced in a unit intimately associated with the turbine. In its operation air is compressed in a compressor and burned with fuel injected into a combustor. The hot combustion gases are expanded through the turbine itself and discharged again into the air. The gas turbine itself operates on the same principle as the steam turbine. The turbine drives the compressor and the excess power is used to drive the load.

PRIOR ART COMBUSTION SYSTEMS

At the present time in the operation of gas turbines all of the combustion supporting gas is normally introduced into the turbine via the combustion chamber, although some gas may be by-passed. It is common practice to employ of the order of 3 to 6 times the theoretical amount of air required to burn the fuel in the combustion chamber. The excess air or other combustion supporting gas is employed to control the temperature of the combustion gas going to the turbine. By this method it is difficult to insure complete combustion particularly of liquid and solid fuels due to the difficulty of securing perfect mixing of fuel and air, and particularly of securing good mixing at an early stage in the travel of the gas through the combustion space. This method is further plagued by attack on the walls of the combustion space due to high temperature erosion occasioned by localized high velocities and the like.

NOVEL COMBUSTION SYSTEM

The present invention affords an efficient method of temperature control, assures complete combustion and provides a gas of constant and uniform temperature for introduction into the turbine. According to the invention, combustion is carried out by supplying to a combustion chamber containing a quantity of subdivided solids continuously flowing therein, a fuel and only the substantially theoretical amount of compressed combustion supporting gas, such as air or oxygen, to burn the fuel to its ultimate combustion products, namely $CO_2$ and water vapor. The combustion chamber may consist of a single combustion zone or a series of combustion zones to insure clean up of the fuel undergoing combustion. All or a portion of the circulating solids, now hot due to absorption of combustion heat, is withdrawn from the combustion chamber, and contacted outside the combustion chamber with a second gas (which by-pass the combustion chamber) such as excess compressed air or recycle turbine exhaust gas. The by-passed gas extracts heat from the solids. The hot by-passed gas is separated from the solids and combined with the hot combustion gases and the mixture sent to the gas turbine. The mixture of by-passed gases and solids is separated in a gas-solids separating device such as a single cyclone system. The separated solids now considerably reduced in temperature are returned to the combustion chamber. The hot combustion gases emerging directly from the combustion zone may be present during the contact of the hot solids and the second by-passed gas or the streams may be mixed separately after removal of all solids therefrom.

The combustion is preferably carried out in the presence of solids in the fluidized state. In this operation the combustor is a "jiggler" type of vessel in which the velocity of the gas flowing upwardly through the bed of solids is limited by that necessary to obtain good fluidization. Velocities as high as 5 ft./sec. may thus be tolerated but a velocity of 1 ft. to 2 ft./second is preferred. Operation with a fluidized solid makes for a more constant temperature, avoiding localized overheating and the very serious punishment that occurs in ordinary units.

Other combustion systems which permit the flow of subdivided solids therethrough may also be used. What is desired is intimate contact of the solid particles with the burning fuel so that the solid particles may pick up heat therefrom. For example, rotating cylinder burners equipped with shelves to pick up the solids and allow them to drop through the flame are perfectly operable.

There are three general methods by which heat may be extracted from the hot solids in the operation of this invention. These methods are cited as exemplary and the invention is not necessarily restricted thereto. These methods are (a) contact of by-passed gases and hot solids in a transfer line system; (b) an upflow combustor system wherein the entire bed of fluidized solids is removed overhead to a cyclone system wherein contact of the hot solids with the by-passed gases occurs; or (c) contact of the cool by-passed gases and hot solids in a second fluidized bed contained in a vessel separate from the combustion chamber itself.

The combustion system employed is one in which a relatively large quantity of gas is to be heated by the heat effect of the combustion reaction in which, however, only a limited fraction of the gas will actively participate in the combustion reaction and the accompanying heat evolution. The purpose of the invention therefore is: (1) to introduce into the combustion chamber only the amount of gas necessary to conduct the combustion reaction effectively; (2) to keep the temperature in the combustion chamber from rising unduly by flowing through it continuously a subdivided solid which will abstract the excess heat; (3) withdrawing the hot solid from the combustion chamber and mixing it with the rest of the gas (by-passed gas) for the purpose of heating that gas by having the solid give up sensible heat to it; and (4) followed by separating and recycling the solid to the combustion chamber, while the hot by-passed gas and the combustion gases are mixed and fed to the turbine unit.

The presence of solids, even relatively inert ones, in intimate contact with reacting gases in a combustion zone have decided catalytic effects on the reaction. This makes it possible to secure excellent combustion if such solids be present at temperature levels definitely below those at which similar results could otherwise be achieved. The presence of the solids preferentially reduces localized overheating, that is, localized high temperature, which in turn greatly reduces the punishment on the combustion chamber lining and the equipment in general. The presence of subdivided solids in relatively high concentration and well distributed through the gas in the combustion chamber promotes gas mixing by the influence of these solids on the flow patterns of the gas, so that combustion is rendered more complete thereby. Moreover when mixing two streams of gas of different temperatures in the presence of such solids, for example, when mixing hot combustion gas with the by-passed gas, the presence of the solids adds very greatly in distributing the heat so that the mixed gas is at a more uniform temperature than would result from the gas mixing alone, even in the same equipment in the absence of the solids.

The manner in which the invention is carried out will be more fully understood from the following descriptions when read with reference to the accompanying drawings which represent semi-diagrammatic views in sectional elevation of apparatus suitable for the purpose.

Figure 1 represents the preferred embodiments of the invention in which heat is abstracted from the hot solids by the by-pass gas in a transfer line of restricted cross section during passage of the solids from the combustion zone to the gas-solids separating device; or in which the by-pass gas is contacted with the hot solid in a cyclone system wherein all of the fluidized solids are removed overhead in an up-flow system from the combustion chamber.

Figure 2 represents another embodiment of the invention in which contact of the hot solids and the by-pass gases occurs in a fluidized bed of solids contained in a vessel separate from the combustion chamber itself.

Referring to Figure 1, numeral 1 represents a combustion chamber containing a subdivided solid substance 7 supported on a grid 2. The solids, when fluidized with an appropriate gas as will be later described, resemble a boiling liquid having a well defined upper level L. The diameter of vessel 1 is determined by the gas velocity necessary for good fluidization and its depth must be sufficient to give adequate contact time for reaction and heat transfer between solids and gases. The subdivided solids contained in vessel 1 develop good gas mixing and therefore assure constant steady temperature and absence of localized overheating. Vessel 1 should be kept hot enough for good combustion. However, only the substantially theoretical amount of air is added to the vessel with the temperature control maintained by the rate of solids flowing through the vessel. This is assured by controlling the rate of flow of solids by operation of the valve in standpipe 12 or in another embodiment of the invention by controlling the rate at which the solids are removed overhead to the cyclone system 8 directly from the fluidized bed in the combustion chamber.

Fuel is introduced into the combustion chamber via line 3. The fuel can be a hydrocarbon gas such as methane, ethane, or natural gas; a liquid hydrocarbon, such as diesel oil, bunker fuel oil; or a solid fuel such as powdered coal, etc. The combustion system of this invention is particularly adaptable to the economical use of ash containing heavy fuel oils and coal. Of course, cleaner fuels such as the gases mentioned are ideal. Cold air is sucked in from the atmosphere via line 4 and compressed in compressor 5 at a pressure of 75 to 200 p. s. i. g., preferably 90 to 150 p. s. i. g. The compressor employed is the usual axial flow type compressor. The total compressed air is removed from the compressor via line 6 and preheated in indirect heat exchange with hot turbine exhaust gas by passage through heat exchanger 27. There is introduced from line 6 into combustor 1 an amount of air substantially equal to the theoretical amount of air required to burn the fuel in the combustor to $CO_2$ and water vapor. When employing a gaseous fuel the fuel and air may be mixed prior to introduction into combustor 1. The balance of the preheated compressed air continues its course through lines 25 and 28 as will be later explained. This quantity of air amounts to as much as of the order of six times the theoretical air introduced into vessel 1 depending mainly on the thermal characteristics of the turbine cycle, particularly the thermodynamic efficiency of the turbine itself, of the compression system, of the heat exchangers, and the heat losses from the various parts of the system. For instance, since it is common in turbine systems to use 3 to 6 times the theoretical amount of air required for combustion, the amount of gas in line 25 may be about 2 to 5 times the amount of air introduced into vessel 1 through line 6. The fuel is burned in vessel 1 in the presence of the above-mentioned solids which are fluidized by the up-flowing compressed air and the resulting combustion gases. Combustion gases travel up through the combustion chamber and pass into the cyclone system 8 directly via line 11 or via lines 9 and 28. The cyclone system 8 operates to separate solid particles from the gas. Solid particles are returned via dip-leg 14 to the combustion zone and the gases, freed of solids, pass overhead via line 17 for direct introduction into the turbine 18. Provision is made for the removal of a stream of these solids via pipe 15, periodically or otherwise, to keep the ash level of the solids at a desired minimum. This purge stream is especially required when high ash content or heavy residual fuel oils or coals are burned in vessel 1.

*(a) Transfer line removal of solids*

In one modification of the system of Figure 1 hot fluidized solids are removed from the combustion zone 1 by overflow into withdrawal well 10 at a point below the dense phase level L. These solids flow hydraulically into standpipe 12 which contains aeration taps for introduction of aerating gas as is common in the handling of fluidized solids. These solids are transported in a low density, high velocity stream via lines 25 and 28 by means of excess compressed air from line 6, but preferably by means of preheated compressed recycle turbine exhaust gas from line 24. The mixture of solids and gases is introduced into cyclone system 8. Hot combustion gases flowing through line 9 may be mixed with the solids and by-pass gases prior to introduction into the cyclone system; or, the combustion gases may be introduced into the cyclone directly; or, the combustion gases, free of entrained solids, may be added to the by-pass gases after the latter have been separated from the solids. The combined gas streams are then introduced into turbine 18.

This embodiment of the invention may be carried out in the absence of fluidization of the solids. Thus solid particles of larger size than is necessary for good fluidization are introduced into the top of combustor 1. These solids are allowed to gravitate to the bottom of the vessel where they are removed through withdrawal well 10 and pipe 12 of Figure 1. The solids are then transported to cyclone system 8 by means of a bucket conveyor or other well known type of solid transfer apparatus. The by-pass gases contact the hot solids in the conveyor system. Separation occurs in cyclone system 8 and the solids are returned to vessel 1 to repeat the cycle. In a similar manner the combustor may be operated in a manner similar to a burner employing a rotary cylinder equipped with shelves in which the solids are picked up and allowed to drop through the flame. The hot solids are then removed from the bottom of the combustor and conveyed in a similar system as described to cyclone system 8. The latter two methods are not preferred to the fluidized solids type of operation.

*(b) Up-flow solids removal*

In another modification of the operation of the apparatus of Figure 1 the entire bed of solids contained in the combustor is removed overhead in the form of a suspension of the solids in the combustion gases and conveyed to a cyclone system 8. In this operation the valve in standpipe 12 is closed and the only material flowing through lines 25 and 28 will be the excess compressed air or the compressed turbine exhaust gas. The only contact with the latter gases and solids will then occur in cyclone system 8. Gases are separated from the solids which are returned to the bed via dip-leg 14 and the gases, as before, are removed overhead from the cyclone system 8 and sent to the turbine.

The upper temperature limit of the solids in vessel 1 is the highest temperature permissible for good combustion without hindering the fluidization of the solids. The temperature is usually 20 to 500° F. higher than the gas fed directly to the turbine but preferably 150° F. to 200°

F. higher. It is known, of course, that it is desirable to secure a temperature in the turbine gases as high as the metal of the turbine will stand. This, of course, depends on the chemical composition of the turbine metal; that temperature today falls in the range of 1200° F. to 1600° F., preferably about 1400° F. Higher temperatures of 1800° F. to 2000° F. or even higher are desirable. However, these temperatures are not in sight today at the present stage of metallurgical development and consequently temperatures in burner vessel 1 will normally range between about 1350 and 1800° F.

(c) Second fluidized bed

In another modification of the invention as illustrated in Figure 2, hot solids are withdrawn from vessel 1 via withdrawal well 10 and standpipe 12 at a temperature of 1400° F. to 1800° F., preferably about 1600° F. These solids are conveyed to vessel 11 with the aid of up-flowing gases such as compressed air entering via line 6 or compressed exhaust gas entering via line 24. The mixture of solids and gases flows up through pipe 25 to vessel 11 where a second fluidized bed having a well defined upper level L' is formed. During passage through pipe 25 and during contact in vessel 11 the gases become heated by abstraction of heat from the solids in vessel 11 and cyclone 26 wherein any entrained solids are removed from the gas and returned to the bed by means of the dip-leg. The gases emerge from cyclone 26 via pipe 16 and are mixed with the hot combustion gases in line 17. The mixture of gases, freed of entrained solids, then enters turbine 18. Alternatively, cyclone 8 in combustor 1 and cyclone 26 of vessel 11 may be combined into a single cyclone system and both gas streams 9 and 16 passed into the same cyclone system. The cooled solids from which heat has been abstracted are removed from vessel 11 via withdrawal well 13 and standpipe 14 and are returned to vessel 1. Standpipe 14 is equipped with the usual aeration taps. Line 15 is a purge line as indicated by the same numeral in Figure 1.

In the operation of the process of Figure 2 fuel is burned in the combustor in the presence of the solids in the same manner as in Figure 1. The compression and heat exchange systems likewise operate in the same manner as related for Figure 1.

Ordinarily, the by-passing of the air or other gases around a combustion chamber as described in the above three embodiments of the invention results in excessively high temperatures in that chamber since the combustion is approximately adiabatic, i. e., one will reach essentially theoretical flame temperature in the combustion chamber. The same would result in combustion vessel 1 and bring about concomitant deterioration of the vessel and its connections were it not for the heat abstracted by solids withdrawal for heating the by-pass gases and return of cooled solids to the vessels.

Thus far a combustion operation for a gas turbine has been described in which the combustion reaction is conducted in a combustion zone through which continuously flows a quantity of subdivided solids, feeding to the combustion zone only the substantially theoretical amount of compressed air to burn the fuel, removing excess heat from the combustion chamber by continuous flow through the chamber of the solids which carry sensible heat, abstracting heat from the solids by mixing them with additional cooler compressed air or compressed recycle exhaust gas, separating the hot compressed gas from the cooled solids and mixing this gas with the combustion gas as feed to the turbine.

TURBINE OPERATION AND EXHAUST GAS CYCLE

The type of turbine employed is not a feature of this invention since the combustion system described is applicable to any type of combustion gas turbine. The simple cycle, intermediate cycle, or complex cycle may be employed. Stage-wise compression may also be employed in connection with the overall operation of the combustion system.

One of the embodiments of the present invention involves the handling and use of exhaust gas emerging from the turbine for the purpose of progressively removing all oxygen from the turbine gas, thus preventing turbine metal corrosion while still achieving complete and perfect combustion. In all modifications of the invention exhaust gas comprising combustion gases and by-passed excess gas, still hot, but reduced practically to atmospheric pressure, emerges from the turbine via line 19. This gas is partially cooled by contacting it with cold air in indirect heat exchange in exchanger 27. After passing through exchanger 27 via pipe 19 part of the exhaust gas is bled off as waste via line 21. The balance of the partially cooled exhaust gas is introduced via pipe 22 into cooler 29. This exhaust gas should be as cool as practicable before entering compressor 23 in order to reduce power consumption there. Cooling, therefore, in cooler 29 is desirable. A water spray type cooler functions effectively because such a cooler can bring the gases down to the lowest practicably obtainable temperature and yet the introduction of some water vapor into the exhaust gas does not usually interfere with its effectiveness in the cycle from then on. Inter-stage cooling of this type in the compression occurring in the compressor 23 is very helpful in cutting down power consumption in that unit. After cooling, the gas is introduced via line 30 into compressor 23 and recompressed to a pressure of 75 to 250 p. s. i. g., preferably 90 to 150 p. s. i. g. The gas is then returned via pipe 24 through exchanger 27 to withdraw additional heat from gases entering the exchanger through line 19. Preheated compressed recycle exhaust gas is then introduced into line 25 for contact with the hot solids emerging from vessel 1, serving enroute as lift gas to convey solids from standpipe 12 when such modifications of the solids flow are employed. Employing recycle exhaust gas, the by-passed gas entering line 17 is of such diminished oxygen content as to be almost negligible after a number of cycles. In this manner the amount of hot free oxygen contacting the turbine metal is eliminated or reduced to an insignificant degree. As a result, overall wear and tear on the turbine is reduced.

Cooling of the hot turbine exhaust gas can also be carried out by passing the gas upwardly through a bed of cooled solids which extracts heat therefrom. These solids are removed to a second vessel where they are cooled by blowing with cool air after which they are returned to the first vessel. This cooling system, however, is not preferred to the heat exchanger type illustrated in the drawing by exchanger 27.

The combined gas streams, as previously related, enter the turbine at a pressure of 75 to 250 p. s. i. g., preferably 90 to 150 p. s. i. g. and at a temperature of 1200° F. to 1800° F., preferably about 1400° F. to 1600° F. Pressures of the exhaust gases are usually close to atmospheric. Exhaust gas temperatures depend upon the nature of the whole turbine cycle and the exhaust gas pressure. In the usual commercial operation employing a feed gas to the turbine of 1200–1600° F. the exhaust gases fall to a temperature of 400–800° F. Pressures and temperatures throughout the turbine system depend on the turbine design which in turn is profoundly influenced by a large number of operating conditions in the power plant part of the system which vary from case to case. However, as previously stated, the novel features of this invention reside not in the turbine itself or in its operation, but in the novel preparation of the gases fed to the turbine and in the novel use of the exhaust gas coming from the turbine.

NATURE OF THE SOLIDS EMPLOYED

The solid substance employed in the process of this invention should be one which (a) is capable of fluidization, (b) will not flux at suitable combustion chamber temperatures, (c) is cheap, (d) is a good carrier of ash from such fuels as residual fuel oil, (e) will not melt at temperatures below 1400° F. to 2000° F. or even higher, (f) is not destroyed by combustion, and (g) preferably contains a metal oxide stable under furnace conditions which will rapidly oxidize the fuel. Suitable solids are sands, clays, alumina, kaolin, silica-alumina mixtures, powdered fire brick, iron oxides, particularly a mixture of $Fe_2O_3$ and $Fe_3O_4$, etc.

It is also within the scope of this invention to mix with the above-mentioned suitable solids another solid which will combine with deleterious constituents contained in certain residual hydrocarbon fuels or in the ash produced from the combustion of said fuels. For example, chemicals such as calcium oxide, barium oxide or salts of calcium or barium, such as calcium carbonate, barium carbonate, etc. may be added to the solids in the combustion zone in order to bring about chemical reaction with acidic oxides such as oxides of vanadium contained in the ash resulting from combustion of heavy residual fuels, such as heavy diesel oils, bunker fuel oils, etc. The chemical combination produces salts such as calcium vanadates, barium vanadates, etc. which are non-volatile and remain as residue in the solids employed in combustion zone 1 and which can be separated therewith from the combustion gas. The deleterious effect of these materials on the metal of the turbine is thereby prevented.

The difficult problem of adequate mixing of fuel and air in the combustion chamber is avoided by another modification of this invention which involves the incorporation in the solids in combustor 1 of relatively substantial quantities of metal oxides of a character such that they will oxidize the fuels extremely rapidly at the reactor temperature. The best of these is $Fe_2O_3$ which is not only effective but readily available and cheap. Other oxides such as the oxides of manganese and copper are good substitutes, but not the equivalent of $Fe_2O_3$. Fuel cannot rise through a bed of solids such as that described and escape substantially complete combustion if that bed contains substantial amounts of an oxide such as $Fe_2O_3$ distributed therethrough, and if the bed is of adequate density, depth, and temperature. It has been found that $Fe_2O_3$ contents as low as 10% based on the total solids in the bed are usually adequate. A bed depth of at least 5 feet is preferred although deeper beds offer a greater safety factor in operating, although at the expense of a greater corresponding pressure drop in the bed. The bed density can be as low as 8 to 10 lbs. per cu. ft. although densities twice these amounts and greater are usually desirable. Temperatures as low as 1500° F. can be tolerated although it is desirable to be at a level of 1600° F. or above.

In such a bed (i. e. solids containing a metal oxide such as $Fe_2O_3$) the necessity for complete mixing of fuel and air disappears in that complete combustion of the fuel can be secured without it. However, when so operating it is preferable to add to the combustion zone a modest excess amount of air over the theoretical required for the combustion of the fuel. Any fuel, even though there be no air mixed with it, in its ascending path through the bed passes over and through such a large amount of $Fe_2O_3$ that oxidation of the fuel is complete. It is true that this reduces the $Fe_2O_3$ to $Fe_3O_4$ which latter oxide will by no means give complete oxidation of the fuel. However, the mixing of the solids in a well fluidized bed is so good that in short order that portion of the bed which has been somewhat depleted of its available oxygen (i. e. reduction of some of the $Fe_2O_3$ to $Fe_3O_4$) gets into a zone in the bed through which air mixed with insufficient fuel to combine with all its oxygen is rising. This air reoxidizes the $Fe_3O_4$ back to the $Fe_2O_3$ state. The rate of this reaction at the temperatures existing in the combustion zone is extremely high. Consequently, the $Fe_2O_3$ content of the bed never falls to a serious degree so long as there is a modest excess of air over that essential for combustion of the fuel in the bed. This excess of air is but a small amount of the theoretical air required to completely burn the fuel.

Another feature of this invention is associated with the use in the combustion zone of a mixture of finely divided $Fe_2O_3$ and $Fe_3O_4$ for completing the removal of free oxygen from the turbine gas. Using a mixture of 10–90 wt. percent $Fe_3O_4$ and 90–10 wt. percent of $Fe_2O_3$, but preferably a 50–50 wt. percent mixture of the oxides in the combustion chamber, the solids act on the flywheel principle to control the combustion and offset disadvantageous effects of improper mixing of the fuel and air, as well as serving as a heat transfer medium. In this case removal of heat from the circulated stream of solids is accomplished by contacting with a stream of recycled exhaust gas rather than excess air. If any appreciable excess air over the theoretical is present in the gases, the $Fe_3O_4$ will react with the excess oxygen in the air and be converted to $Fe_2O_3$; while any excess of carbonaceous fuel will react with the $Fe_2O_3$ in the mixture at the prevailing temperature and be converted to $Fe_3O_4$, thus the body of mixed iron oxides acts not only as a heat carrier but also functions as a combustion control. As previously stated this system is ideal for use with recycle turbine exhaust gas.

Having described the invention in a manner such that it may be practiced by those skilled in the art, what is claimed is:

1. A combustion process for producing a combustion gas suitable for feeding to a combustion gas turbine comprising the steps of burning an extraneous combustible fuel with substantially the theoretical amount of a compressed combustion-supporting gas in a combustion zone in the presence of sub-divided solids at a temperature between about 1350° to 1800° F. and a pressure of about 75 to 250 p. s. i. g., removing a combustion gas from the combustion zone, removing heat from the combustion zone by continuous withdrawal of subdivided solids therefrom, abstracting heat from the withdrawn solids by contacting them with a second relatively cold compressed gas equal in amount to about 2 to 6 times the amount of said combustion supporting gas, separating the cooled withdrawn solids from the second heated compressed gas, and combining the combustion gas from the combustion zone with the heated compressed gas to form a turbine gas mixture having a temperature of at least 1200° F. and a pressure of at least 75 p. s. i. g.

2. A process according to claim 1 in which both the combustion-supporting gas and the second cold compressed gas are air, and in which the solids are in a fluidized condition in the combustion zone.

3. A process according to claim 1 in which the solids separated from the additional compressed gas are returned to the combustion zone.

4. A process according to claim 3 in which a portion of said cooled withdrawn solids is rejected from the system to purge it of ash and another portion of said withdrawn solids is returned to the combustion zone.

5. A process according to claim 1 in which the fuel is a hydrocarbon gas.

6. A process according to claim 1 in which the fuel is a petroleum residual fuel oil.

7. A process according to claim 6 in which the solids in the combustion zone also contain a chemical selected from the group consisting of alkaline earth oxides, hydroxides, and salts which reacts with acidic oxides in the ash resulting from combustion of the residual fuel oil.

8. A process according to claim 1 in which the gases enter the turbine at a temperature of 1400° F. to 1600° F. and at a pressure of 90 to 150 p. s. i. g.

9. A process according to claim 1 in which said turbine gas mixture is passed through a gas turbine, cooled, recompressed and recycled to serve as the second relatively cold compressed gas so that the resulting hot turbine gas mixture is substantially free of oxygen.

10. A process according to claim 1 in which the solids comprise a mixture of $Fe_2O_3$ and $Fe_3O_4$, and in which the second compressed gas is exhaust gas from the turbine.

11. A combustion process for a combustion gas turbine comprising the steps of burning an extraneous combustible fuel with substantially the theoretical amount of a combustion-supporting gas at a pressure of 75 to 250 p. s. i. g. in a combustion zone at a temperature between about 1400° to 1800° F. containing a bed of fluidized solids having a well-defined upper level, whereby the solids become hot due to absorption of the heat of combustion, removing hot, compressed combustion gases from the combustion zone, removing hot solids from a bottom portion of the combustion zone, contacting and fluidizing the withdrawn solids with a second relatively cold compressed gas also at a pressure of 75 to 250 p. s. i. g., in a mixing zone, whereby heat is transferred from the hot solids to the second gas, passing the resulting cooled solids and heated second gas into a gas-solids separating zone, separating the solids from the second compressed gas, combining the second hot compressed gas with the hot compressed combustion gases in a ratio resulting in a gas mixture having a temperature between about 1200 and 1600° F. and about 150 to 200° F. lower than said combustion zone temperature and introducing the mixture of hot compressed gases to a gas turbine.

12. A process according to claim 11 in which the second compressed gas is air.

13. A process according to claim 11 in which a stream of hot turbine exhaust gas at low pressure is cooled, recompressed and returned to said mixing zone to serve as said second relatively cold compressed gas so that the resulting processed gas mixture is substantially free of oxygen, and in which substantially all hot turbine gas exhausted at low pressure from the turbine is passed in indirect heat exchange relation with both said combustion-supporting gas and said stream of cooled recompressed turbine exhaust gas.

14. A process for producing hot gases which comprises injecting a hydrocarbon fuel into a combustion zone, burning said fuel with substantially the theoretical amount of a compressed combustion supporting gas in the combustion zone in the presence of finely divided fluidized solids at a combustion temperature between about 1400° and 1800° F. and a pressure of about 75 to 250 p. s. i. g., said solids being in direct contact with and fluidized by said combustion gas, removing a combustion gas substantially at combustion temperature from the combustion zone, removing heat from the combustion zone by continuous withdrawal of finely divided solids therefrom, abstracting heat from the withdrawn solids by contacting them with a second relatively cold compressed gas in a second solids contacting zone, separating the cooled withdrawn solids from the second heated compressed gas, and combining the combustion gas from the combustion zone with the heated compressed gas from the second contacting zone in a ratio of about 1 part of said combustion gas per 2 to 6 parts of said second heated gas to produce a gas mixture having a pressure of at least 75 p. s. i. g. and a temperature of about 1200° to 1800° F. and about 20 to 500° F. lower than said combustion temperature.

15. A combustion gas turbine system comprising a turbine, a combustion chamber for the combustion of a combustible fuel and adapted to contain finely divided non-combustible solid particles in contact with combustion gases, means for withdrawing combustion gas from the combustion chamber, means for introducing fuel into said combustion chamber, means for introducing combustion supporting gas to said combustion chamber, a cooling zone separate from said combustion chamber, means for introducing cooled gas into said cooling zone, means for conveyig hot finely divided solids from said combustion chamber to said cooling zone, means for removing heated gas from the cooling zone, means for combining the withdrawn combustion gases with the heated gas withdrawn from the cooling zone, and means for introducing said combined gases to the gas turbine.

16. A combustion system comprising a combustion chamber for the combustion of a combustible fuel and adapted to contain finely divided non-combustible solid particles in contact with combustion gases, means for withdrawing combustion gas from the combustion chamber, means for introducing fuel into said combustion chamber, means for introducing combustion supporting gas to said combustion chamber, a cooling zone separate from said combustion chamber, means for introducing cooled gas into said cooling zone, means for conveying hot finely divided solids from said combustion chamber to said cooling zone, means for returning solids from the cooling zone to the combustion chamber, and means for combining the withdrawn combustion gas with the heated gas withdrawn from the cooling zone.

17. A combustion process for producing hot gases which comprises injecting a combustible fuel into a combustion zone, burning said fuel with substantially the theoretical amount of a compressed combustion supporting gas in a combustion zone in the presence of finely divided fluidized none-combustible solid particles but in direct contact with and fluidized by said combustion gas, removing combustion gas from the combustion zone, removing heat from the combustion zone by continuously withdrawing finely divided solids therefrom, abstracting heat from the withdrawn solids by contacting them with a second relatively cool compressed gas in a second solids contacting zone, separating the cooled, withdrawn solids from the second heated compressed gas, returning the cooled solids from the second solids contacting zone to the combustion zone, and combining the combustion gas from the combustion zone with the heated compressed gas from the second solids contacting zone.

References Cited in the file of this patent

UNITED STATES PATENTS

| Number | Name | Date |
|---|---|---|
| 798,855 | Wentworth | Sept. 5, 1905 |
| 2,305,785 | Jendrassik | Dec. 22, 1942 |
| 2,322,987 | West | June 29, 1943 |
| 2,389,636 | Ramseyer | Nov. 27, 1945 |
| 2,399,450 | Ramseyer | Apr. 30, 1946 |
| 2,446,388 | Ramseyer et al. | Aug. 3, 1948 |
| 2,506,542 | Caldwell, Jr. et al. | May 2, 1950 |
| 2,545,162 | Muly et al. | Mar. 13, 1951 |
| 2,562,804 | Martin et al. | July 31, 1951 |

FOREIGN PATENTS

| Number | Country | Date |
|---|---|---|
| 10,759 | Great Britain | Aug. 5, 1887 |